United States Patent Office 3,061,412
Patented Oct. 30, 1962

3,061,412
PREPARATION OF MERCURIC SULFIDE
Anthony Giordano, 3838 E. 151st St., Cleveland, Ohio
No Drawing. Filed Feb. 16, 1960, Ser. No. 8,901
1 Claim. (Cl. 23—134)

This invention relates to a method of manufacturing mercuric sulfide and mercuric sulfide dispersions and products obtained therefrom.

Mercuric sulfide has long been prepared by various processes, such as, for instance, by strongly compressing mixtures of sulfur and mercury, by mixing sulfur and mercury in rotating cylinders and then heating the mixtures in retorts equipped with capitals to that mercuric sulfide is collected in the capitals and by digesting mercury with agitation in an aqueous solution of ammonium or alkali polysulfide in the presence of elemental sulfur.

While all of the above methods will produce mercuric sulfide, mercuric sulfide suitable for special applications often requires certain physical characteristics. Mercuric sulfide employed in the production of pigments, for instance, and particularly in certain methods of production of pigments of the class known as cadmium-mercury reds necessitates a critical mercuric sulfide particle size. A prerequisite to the formation of a solid solution type cadmium-mercury red pigment is that the mercury and cadmium components be combined with a certain degree of intimacy prior to calcination. Such intimacy is dependent upon the magnitude of attractive forces between individual particles of the various components. These forces, in turn, depend upon particle size, that is, the smaller particles will result in greater attractive forces than corresponding larger particles. If the particles are too small, the attractive forces will be such that hard, very tightly bound aggregates will be produced, which are undesirable in the formation of cadmium-mercury red pigments. The more prevalent condition, however, is that the particles are too large and the attractive forces are therefore insufficient.

Cadmium-mercury red pigments are commonly produced by preparing solid solutions of mercuric sulfide in cadmium sulfide. The solid solution, as has been explained in the preceding paragraph, may only be obtained from intimate admixtures of the cadmium and mercury components. At present mercury components of the desired particle size are obtained by precipitation, the precipitation process generally being combined in a manner so as to co-precipitate both cadmium and mercury components in the same operation. The co-precipitation method of the prior art is generally carried out as follows.

CO-PRECIPITATION METHOD (A) Reactants:
 (1) $HgCl_2 + H_2O$ to form $HgCl_2$ solution.
 (2) $CdSO_4$ solution.
 (3) BaS solution.
(B) Procedure:
 (1) $HgCl_2$ and $CdSO_4$ solutions are mixed together.
 (2) $HgCl_2$—$CdSO_4$ mixture is precipitated with BaS as follows:
 $CdSO_4 + HgCl_2 + 2BaS \rightarrow CdS.HgS.BaSO_4 + BaCl_2$
 (3) Precipitate of step 2 is filtered and washed free of by-product $BaCl_2$.
 (4) Filter cake from step 3 is dried.
 (5) Dried cake (green-cake) is calcined at about 500° C.
 (6) Calcined product is quenched in water in order to cool and arrest calcination at correct point.
 (7) Quenched product is ground, filtered, and dried.
 (8) Dried finished cake is pulverized.

The precipitation process, however, is undesirable in that: multiple operations are involved, water soluble mercury compounds which are essential to the process are very expensive, handling the extremely poisonous and corrosive water soluble mercury compounds is hazardous and the washing out of by-product salts is necessitated.

Another method which may be employed in the production of solid solutions of cadmium-mercury is a method which is set forth in U.S. Patent No. 2,850,402 and which may be defined as "the direct method of introducing HgS." The "direct method" is conveniently carried out as follows.

DIRECT METHOD OF INTRODUCING HgS (A) Reactants:
 (1) Elemental Hg and S, plus alkali polysulfide.
 (2) $CdSO_4$ solution.
 (3) BaS solution.
(B) Procedure:
 (1) Hg and S are reacted in presence of alkali polysulfide solution to form HgS.

$$Hg + S + H_2O \xrightarrow{Na_2S_x} HgS \text{ slurry}$$

(2) $CdSO_4$ is precipitated with BaS as follows:

$CdSO_4 + BaS \rightarrow CdS.BaSO_4 \downarrow (Cd \text{ lithopone})$ (3) HgS slurry from step 1 and cadmium lithopone precipitate of step 2 are mixed to form:

CdS.HgS.BaS

Intimate mixture required at this point (4) Mixture of step 3 is filtered—*no* washing necessary.
 (5) Filter cake is dried.
 (6) Subsequent steps are same as precipitation method, starting from step 5.

The direct method while eliminating the undesirable features of the co-precipitation method has not been extensively employed due to the difficulty in obtaining suitable mercuric sulfide or more specifically mercuric sulfide slurries of the proper particle size.

It is, therefore, an object of this invention to provide an improved process for producing mercuric sulfide of a preselected particle size.

It is another object of this invention to provide an improved process for producing an aqueous dispersion of mercuric sulfide of a preselected particle size.

I have now discovered a method of preparing mercuric sulfide having physical characteristics which lend themselves to the direct method of preparation of cadmium-mercury pigments.

MERCURIC SULFIDE PREPARATION

The method of producing a finely divided dispersion of mercury sulfide from elemental mercury and elemental sulfur may be stated broadly as being one wherein elemental mercury and at least stoichiometric proportions of elemental sulfur are reacted to form mercury sulfide by mixing in an aqueous solution of sodium polysulfide having a formula of $Na_2S_x$ throughout the entire period of the reaction, wherein $x$ is at least 3 and preferably at least 4. It will be evident that the sodium polysulfide solution may also be described as a sodium sulfide solution having at least 3 atoms of sulfur dissolved therein and that greater than 3 atoms of sulfur may be dissolved in the sodium sulfide solution depending upon the amounts of sulfur present in excess of the stoichiometric amounts required to form mercury sulfide.

The amount of sodium polysulfide employed and the degree of agitation determine the speed of the reaction between the elemental mercury and sulfur. Very small amounts of sodium polysulfide appear to be effective in increasing the speed of the reaction. Optimum results, however, have been obtained when the amount of sodium polysulfide utilized ranges from about 0.015 to about 0.5 mole of sodium polysulfide per mole of elemental mercury. In general, an increase in the ratio of sodium polysulfide to elemental mercury employed ($Na_2S_x/Hg$) increases the rate of the reaction. Above a molecular ratio of about 0.5, however, the rate of increase in the reaction rate does not appear to be as great as within the indicated range. Similarly, the rate of the reaction is influenced by the degree of agitation, being faster with greater agitation and mixing action. When employed together, the two rate influencing factors enhance each other and so various combinations of them can produce a wide range of reaction periods. Consequently, the quantity of sodium polysulfide employed may be varied to suit various forms of mixing and agitation equipment. For example, if the reaction is carried out in a ball or pebble mill, which offers relatively slow agitation, the speed of reaction may be increased by employing a concentration of catalyst approaching 0.5 mole of sodium polysulfide per mole of mercury. On the other hand, if the reaction is carried out in apparatus which produces violent agitation similar to a Waring Blendor, the speed of reaction can be reduced by employing a sodium polysulfide amount approaching 0.015 mole of the polysulfide per mole of mercury.

In general, the concentration of the sodium polysulfide will be determined by the type of equipment in which the agitation and mixing of the mercury and the sulfur takes place. Concentrations of sodium polysulfide ranging from 0.005 to 1.5 (as $Na_2S$) per mole of Hg may be successfully employed. The concentration of sodium polysulfide affects the chemical reaction, as is to be expected, according to the law of mass action. However, the ratio of sulfur in the sodium polysulfide is a critical factor in determining the particle size of the resultant mercuric sulfide.

With respect to the temperature of the reaction, the reaction is preferably conducted at temperatures ranging from about room temperature (20° C.) to about 70° C. The reaction may be considered as moderately exothermic in that when the mixing of the elemental mercury and sulfur is initiated at room temperature, the temperature of the mixture gradually rises. In general, it is best not to permit the temperature to exceed about 90° C. since sulfur is more soluble in the sodium polysulfide solution at higher temperatures and there is danger of depriving the mercury of sulfur so that the reaction will not be completed unless larger excesses of sulfur are present. Additionally, there is a tendency for the particles of mercury sulfide to increase in size at temperatures above about 90° C. in spite of agitation. Generally, however, there is no difficulty in maintaining the temperature below about 70° C. without the need of cooling.

It is essential that sulfur be present in excess of the stoichiometric amount necessary to combine with the elemental mercury and in amounts sufficient to give a sodium polysulfide solution equivalent to a sodium sulfide solution ($Na_2S$) having at least 3 atoms of sulfur dissolved therein. Otherwise, the product formed will be contaminated with elemental mercury. Furthermore, the dissolved sulfur retards crystal growth. In this regard the dispersed form should be kept in the sodium polysulfide solution until employed, for example, in the production of pigments.

The agitation of the principal components in the sodium polysulfide solution is preferably conducted until all of the mercury has been converted to black mercury sulfide although it may also be continued until red mercury sulfide is produced. The latter form, however, has a greater tendency to increase in particle size. The agitation is accompanied by a grinding, attritive, impact or other shearing force. The shearing force has been found to be a necessary feature of the agitation to prevent the formation of agglomerates or the formation of substantial quantities of crystals in excess of 1 micron. While certain specific mechanical agitation means have been set forth for carrying out the process of this invention, it should be understood that any shearing type agitation which will break up agglomerates and reduce crystal size is within the scope of this invention.

Ball milling, other grinding action, shearing, any attrition, fracturing or like means of deagglomeration are herein called "comminution" following Webster (New 20th Century Dictionary, second edition, p. 364).

The following exemplify the process of the invention directed to the production of mercury sulfide and are presented by way of illustration and are not to be construed as limiting the scope of the invention thereto.

*Example I*

188.5 grams of mercury, 31.8 grams of sulfur, and 110 grams of a 20% sodium sulfide solution ($Na_2S$) were placed in a laboratory Waring Blendor and it was found after 20 minutes that all of the mercury had been converted to black mercuric sulfide having a particle size suitable for use in the preparation of cadmium-mercury pigments.

*Example II*

As another method of preparing mercury sulfide, 401.2 grams of elemental mercury, 77 grams of elemental sulfur amounting to 13 grams of excess sulfur, together with 30 grams of a 15% solution of sodium sulfide and 180 grams of water were charged to a ball mill which was operated for 24 hours. At this point it was found that no residual mercury was remaining and that the reaction had gone to completion.

*Example III*

A sodium polysulfide solution was made by dissolving 70 grams of elemental sulfur flour in 300 grams of 15% sodium sulfide ($Na_2S$) solution. To illustrate the effect of different proportions of sodium sulfide on the rate of the reaction of elemental mercury and elemental sulfur, three runs were made wherein identical amounts of mercury and sulfur, namely 100 grams of mercury and 17.6 grams of sulfur (amounting to 1.62 g. excess sulfur) were placed into one-half pint glass jars half-full glass beads of ⅛" diameter and various proportions of sodium polysulfide solution added thereto. These jars were subjected to agitation on a paint shaker as indicated in the table below.

| Run No. | Grams of Polysulfide Solution Used | $Na_2S/Hg$ | Grams of $H_2O$ Used | Grams Total Excess Sulfur Used | $S/Na_2S$ | Time to Complete Reaction, Hours |
|---|---|---|---|---|---|---|
| 1 | 5 | .0156 | 70 | 2.566 | 10.27 | 4.5 |
| 2 | 15 | .0469 | 60 | 4.458 | 5.95 | 2.5 |
| 3 | 50 | .156 | 15 | 11.08 | 4.44 | .75 |

The form of mercuric sulfide resulting from the herein described invention may be identified as being 100% less than 20 microns, 90% less than 10 microns, 85% less than 5 microns, and 75% less than 1 micron. Mercuric sulfide of this type and aqueous dispersions thereof have an affinity for certain precipitates, such as cadmium sulfide (CdS) and cadmium sulfide lithopone ($CdS \cdot BaSO_4$) resulting in very intimate mixtures. As a result of these particular physical characteristics, the mercuric sulfide of this invention is suitable for the direct method of production of cadmium-mercury pigments as described in U.S. Patent No. 2,850,402. It has been found, however, that the mercuric sulfide of this invention must be employed in the form of a slurry. If the mercuric sulfide is dried first and an attempt is then made to react, it will be found that the mercuric sulfide particles have agglomerated and are no longer suitable for pigment purposes. The cadmium-mercury red pigments resultant from the use of the novel mercuric sulfide in the process of U.S. Patent No. 2,850,402 are superior to pigments produced by the co-precipitation process which had formerly been the only extensively employed process in the art.

Having thus described my invention, what I claim is:

A process for the preparation of mercuric sulfide of particle size suitable for use in the manufacture of pigments comprising reacting elemental mercury and elemental sulfur in the presence of an alkali metal polysulfide, the quantities of elemental mercury and elemental sulfur being such that the sulfur is in excess of the stoichiometric amount required to produce HgS and the amount of said polysulfide being such that there will be present throughout the reaction from 0.015 to 0.5 mole of the polysulfide for each mole of elemental mercury, there being at least three moles of sulfur in each mole of alkali metal polysulfide, the reaction being carried out in aqueous medium at the above concentrations and in a temperature range from room temperature to 90° C. and subjecting the reaction medium to simultaneous agitation and comminution whereby to produce finer particles and to retard the formation of aggregates of such particles once formed, the resulting size of the particles being at least 75% of a size finer than one micron and at least 90% of a size finer than 10 microns.

References Cited in the file of this patent

Mellor: Comprehensive Treatise on Inorganic and Theoretical Chemistry, vol. 4, page 948, paragraph 1.

UNITED STATES PATENT OFFICE
CERTIFICATE OF CORRECTION

Patent No. 3,061,412

October 30, 1962

Anthony Giordano

It is hereby certified that error appears in the above numbered patent requiring correction and that the said Letters Patent should read as corrected below.

In the grant, lines 1 to 3, for "Anthony Giordano, of Cleveland, Ohio," read -- Anthony Giordano, of Cleveland, Ohio, assignor to The Harshaw Chemical Company, of Cleveland, Ohio, a corporation of Ohio, --; line 12, for "Anthony Giordano, his heirs" read -- The Harshaw Chemical Company, its successors --; in the heading to the printed specification, line 3, for "Anthony Giordano, 3838 E. 151st St., Cleveland, Ohio " read -- Anthony Giordano, Cleveland, Ohio, assignor to The Harshaw Chemical Company, Cleveland, Ohio, a corporation of Ohio --.

Signed and sealed this 2nd day of April 1963.

(SEAL)
Attest:

ESTON G. JOHNSON
Attesting Officer

DAVID L. LADD
Commissioner of Patents